(12) United States Patent
Thomas et al.

(10) Patent No.: US 10,187,743 B2
(45) Date of Patent: Jan. 22, 2019

(54) SYSTEM AND METHOD FOR PROVIDING SITUATION AWARENESS VIA A MOBILE DEVICE

(71) Applicant: ORACLE INTERNATIONAL CORPORATION, Redwood Shores, CA (US)

(72) Inventors: George Thomas, San Ramon, CA (US); Yue Zhou, Dublin, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 598 days.

(21) Appl. No.: 14/840,221

(22) Filed: Aug. 31, 2015

(65) Prior Publication Data

US 2017/0064497 A1    Mar. 2, 2017

(51) Int. Cl.
*H04W 4/02* (2018.01)

(52) U.S. Cl.
CPC ..................... *H04W 4/02* (2013.01)

(58) Field of Classification Search
CPC ... H04W 4/021; H04W 72/048; H04W 4/025; H04W 72/046
See application file for complete search history.

(56) References Cited

U.S. PATENT DOCUMENTS

| 6,738,628 B1 | 5/2004 | McCall et al. |
| 7,466,232 B2 | 12/2008 | Neuwirth |
| 7,982,614 B2 | 7/2011 | Holm et al. |
| 2009/0216438 A1 | 8/2009 | Shafer |
| 2014/0278621 A1 | 9/2014 | Medwin et al. |
| 2015/0005011 A1 | 1/2015 | Nehrenz et al. |
| 2016/0021500 A1* | 1/2016 | Won ..................... H04W 40/244 455/456.2 |
| 2016/0066154 A1* | 3/2016 | Shin ....................... H04W 4/80 455/456.1 |

OTHER PUBLICATIONS

Kerry Doyle, Beacons in Healthcare Promise to Increase Field Service Efficiency, Mar. 30, 2015, pp. 1-6, downloaded from: http://fieldservice.com/2015/03/30/beacons-in-healthcare-promise-to-increase-fiend-service-efficiency/.

(Continued)

*Primary Examiner* — Joseph E Dean, Jr.
(74) *Attorney, Agent, or Firm* — Tarolli, Sundheim, Covell & Tummino LLP

(57) ABSTRACT

Systems, methods, and other embodiments are disclosed that provide situation awareness to a user of a mobile computing device. In one embodiment, beacon data is received by the mobile computing device, indicating beacon devices that are within reception range of the mobile computing device within an environment. The mobile computing device accesses local map data and local asset data based on a current location and a user of the mobile computing device. The current location is based on the beacon data and the user is defined by user profile data. The mobile computing device determines a display map and asset icons based on the local map data, the local asset data, and the user profile data. The asset icons are displayed overlaid on the display map on a display screen of the mobile computing device.

26 Claims, 7 Drawing Sheets

(56) References Cited

OTHER PUBLICATIONS

Safelite Autoglass, Mobile Repair Technicians Improve Service and Productivity with Wireless Technology, pp. 1-4, on May 21, 2015 from: http://www.expotechinc.com/downloads/5a4b471d5dc8e50f4ca1ea9464e5a9f3.pdf.

Iknaia Limited, Iknaia Asset and Personnel Tracking Management System for the Construction Industry, pp. 1-8, downloaded May 21, 2015 from: http://www.iknaia.co.uk/wp-content/uploads/2014/09/Iknaia-Construction.pdf, Spalding, LINCS, UK.

Teldio, Increased Awareness with IPS, pp. 1-4, downloaded from: http://media.teldio.com/collateral/product_collateral/Teldio-IPS-Brochure.pdf, Ontario, CA.

IBM, IBM-Maximo Asset Management, pp. 1-2, downloaded on May 21, 2015 from: http://www-03.ibm.com/software/products/en/maximoassetmanagement/.

Frontline Energy & Environmental, FrontlineAllServices, pp. 1-18, downloaded from: http://frontlineenergy.ie/assets/components/uploads/FrontlineAllServicesJan2015.pdf, Dublin, Ireland / London, UK.

* cited by examiner

SYSTEM AND METHOD FOR PROVIDING SITUATION AWARENESS VIA A MOBILE DEVICE

BACKGROUND

A technician may be given a work order to fix a problem with respect to an asset in a facility. The technician may try to identify the location of the asset using an enterprise resource planning (ERP) system which may have information on the last known location of the asset. Alternatively, the technician may need to identify the physical location of an asset based on a campus map located at the campus, a printed map, or printed floor plans that will help the technician locate an asset within a large industrial complex, for example.

Once the technician locates the particular asset, the technician may scan a barcode or search for the asset within the ERP system. After the technician finishes working on the asset from a work order, the technician may move to a next work order line item. The technician may try and work assets that are known to be in the same general location. However, this may take some planning on the part of the technician. For example, the technician may print out a list of all the assets on work orders that the technician may work for the day, and then try and plot a course of work that would be efficient. This can prove to be time consuming and cumbersome, especially if assets are located on multiple floors or are spread out across a large campus.

Even once a route is planned, assets may have moved within a location or even to a different location nearby before the technician can work all of the assets. Technicians may spend a large part of their workday locating assets that may be very near to them, but which are not identified to be worked in a logical order.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
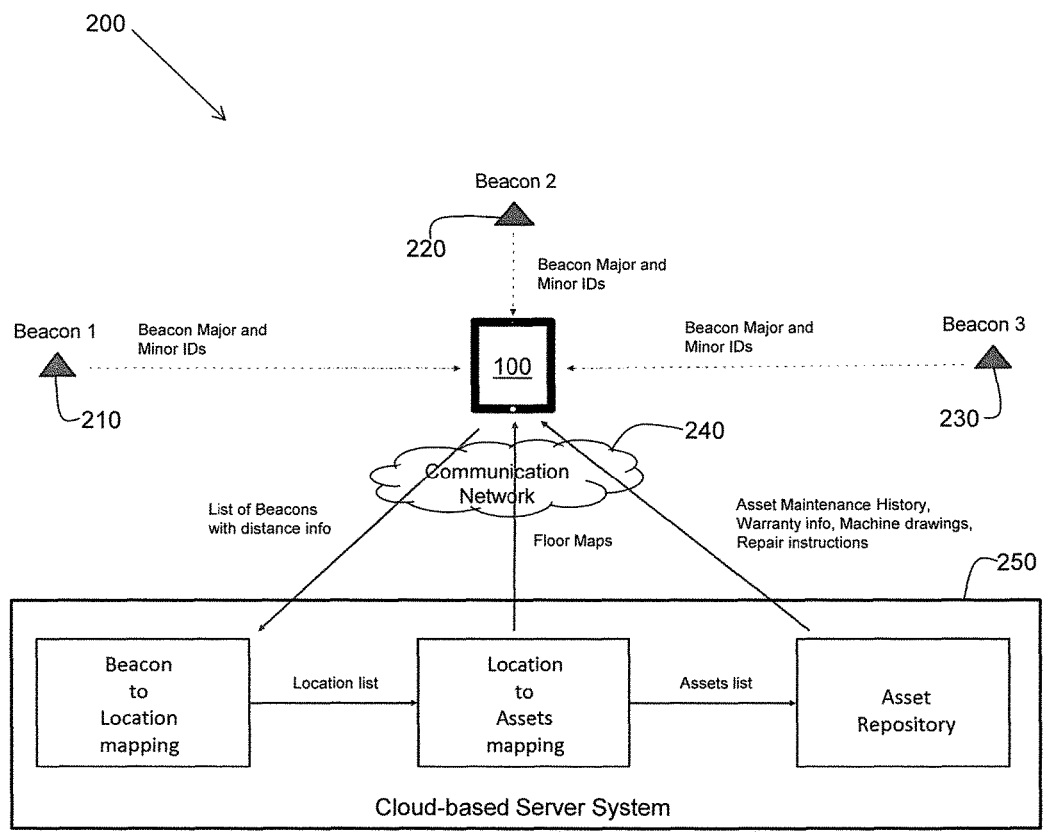
FIG. 1 illustrates one embodiment of a mobile computing device in an environment in which a user is using the mobile computing device.

Systems, methods, and other embodiments are disclosed that relate to a mobile computing device configured to enhance the situation awareness of a user of the mobile computing device within an environment such as, for example, an enterprise. The user may be, for example, a maintenance worker assigned to service one or more assets within the environment. In one embodiment, as the user moves around the environment with the mobile computing device, the mobile computing device receives beacon signals from beacon devices that are within reception range. The mobile computing device accesses local map data and local asset data. The local map data and the local asset data correspond to a current location of the mobile computing device as determined based on the beacon signals, and/or a user of the mobile computing device as defined by user profile data.

In one embodiment, global map data and global asset data are stored in cache memory of the mobile computing device. The local map data and the local asset data are accessed from the global map data and the global asset data, respectively, based on beacon data and user profile data. For example, in one embodiment, the mobile computing device estimates a current location of the mobile computing device based on beacon data (e.g., beacon identification information and distance information). The mobile computing device also stores user profile information associated with the user of the mobile computing device. In one embodiment, when a user logs into a situation awareness application on the mobile computing device, a user profile of the user is accessed. The mobile computing device may access local map data and local asset data based on the current location and the user profile data. The mobile computing device can determine and render a display map and asset icons, based on the map data and the asset data, and display the asset icons overlaid onto the display map on a display screen of the mobile computing device.

In another embodiment, the mobile computing device accesses the local map data and the local asset data from a cloud-based server system, using beacon data and user profile data. The cloud-based server system stores global map data and global asset data from which the local map and asset data may be accessed. For example, in one embodiment, the mobile computing device estimates distance from beacon devices and sends the distance information, along with beacon identification information and user profile information (e.g., user role information: electrician, plumber, HVAC technician, supervisor, auditor, examiner, etc.), to a cloud-based server system (e.g., an enterprise management system (EMS) associated with the environment).

In response to receiving information from the mobile computing device, the cloud-based server system can estimate a current location of the user within the environment based on the beacon identification information and the distance information (e.g., by performing a triangulation technique). The cloud-based server system can match the current location, as well as the user profile data, to local map data and local asset data of the environment stored in a database of the cloud-based server system. The cloud-based server system can dynamically send the matched local map data and local asset data back to the mobile computing device. The mobile computing device can determine and render a display map and asset icons, based on the local map data and the local asset data, and display the asset icons overlaid onto the display map on a display screen of the mobile computing device.

In this manner, a user (e.g., a maintenance worker) can use a mobile computing device (e.g., a cell phone or a tablet computer) to view the display map for a portion of an environment along with associated asset icons. Thus, an improved map including assets is generated with respect to the user's current location. The user can also interact with the display map and the asset icons via a graphical user interface to become more aware of the situation immediately around him. For example, the user can become more aware of assets that need servicing, assets that have recently been serviced, and the locations of assets in relation to the current location of the user.

The following terms are used herein with respect to various embodiments.

The term "environment", as used herein, refers to any enterprise, facility, or campus having assets (located indoors or outdoors) that are, for example, to be serviced, inspected, and/or replaced from time to time. A facility may be a building and a campus may have multiple buildings, for example.

The term "cloud-based server system", as used herein, refers to a computerized system configured to serve at least mobile computing devices. Such cloud-based server systems are accessible via a computer network, in accordance with one embodiment.

The term "enterprise management system (EMS)", as used herein, refers to a type of cloud-based server system that is configured to help manage the assets of an environment with respect to, for example, maintenance, cost, and procurement. One example of an enterprise management system is an enterprise resource planning (ERP) system.

The term "distance", as used herein, refers to a span between a beacon device and a mobile computing device within an environment. Such a span can change as a user moves, with the mobile computing device, with respect to the beacon device.

The term "beacon data" or "beacon information", as used herein, may refer to data transmitted as beacon signals by a beacon device, or may refer to other data derived from signals or data transmitted by a beacon device. Such beacon data may include, for example, beacon identification data provided within beacon signals transmitted by a beacon device, and distance data estimated based on, at least in part, signal strength of the beacon signals.

The term "location", as used herein, refers to an estimate of position of a mobile computing device, with respect to map data stored in an enterprise management system or cached in the mobile computing device, based on beacon data.

The terms "within range" or "within reception range" are used interchangeably herein and refer to a span, between a mobile computing device and a beacon device, within which the mobile computing device can reliably receive signals transmitted by the beacon device.

The term "global map data", as used herein, refers to floor plan information associated with an environment or a large portion of an environment.

The term "local map data", as used herein, refers to a portion of global map data that is limited to an area immediately surrounding a current location of a mobile computing device within an environment.

The term "global asset data", as used herein, refers to information associated with all or a large portion of assets within an environment.

The term "local asset data", as used herein, refers to a portion of the global asset data that is limited to assets within an area immediately surrounding a current location of a mobile computing device within an environment.

FIG. 1 illustrates one embodiment of a mobile computing device 100 that is configured with situation awareness logic (e.g., in the form of a situation awareness application). For purposes of discussion, FIG. 1 shows the mobile computing device 100 in an example environment 200 in which the mobile computing device 100 may operate. The environment 200 includes the mobile computing device 100, three (3) beacon devices 210, 220, and 230, a communication network 240, and a cloud-based server system 250. In one embodiment, the cloud-based server system 250 may be an enterprise management system (EMS). The beacon devices 210, 220, and 230 are installed at fixed locations within an environment such as, for example, an enterprise having various assets. As a user of the mobile computing device 100 moves within the environment, the mobile computing device 100 receives beacon signals transmitted from the beacon devices 210, 220, and 230, assuming that the mobile computing device 100 is within reception range of the beacon devices 210, 220, and 230.

The beacon signals contain beacon information. In accordance with one embodiment, the beacon information includes identification data which includes a beacon major identifier and a beacon minor identifier for each beacon device. The beacon major identifier may identify, for example, a floor in a building within which a particular beacon device is located. The beacon minor identifier may identify, for example, specific coordinates on that floor of the building where the particular beacon device is located. In one embodiment, the beacon signals are compatible with a short-range, low-energy communication protocol such as, for example, a Bluetooth Low Energy (BTLE) protocol.

The mobile computing device 100 is configured to estimate a distance between itself and each beacon device 210, 220, and 230 based on, for example, signal strength of the beacon signals. In one embodiment, the mobile computing device 100 is also configured to wirelessly transmit the distances, along with the list of beacons (i.e., the major and minor identifiers for each beacon), to the cloud-based server system 250 via the communication network 240.

In accordance with one embodiment, wireless communication takes place between the mobile computing device 100 and the communication network 240 via a WiFi communication protocol. In accordance with another embodiment, wireless communication takes place between the mobile computing device 100 and the communication network 240 via cellular telephone (e.g., 4G) communications. Other types of communication protocols between the mobile computing device 100 and the communication network 240 are possible as well, in accordance with various other embodiments.

Upon receiving the beacon information from the mobile computing device 100 via the communication network 240, the cloud-based server system 250 maps the beacon information to an estimated current location of the mobile computing device 100 within the enterprise (beacon to location mapping in FIG. 1). The accuracy of the estimated current location depends on the number of beacon devices for which the mobile computing device 100 is within reception range and the accuracy of the estimated distances, in accordance with one embodiment. For example, the cloud-based server system 250 may employ triangulation techniques to estimate the current location of the mobile computing device 100. In an alternative embodiment, the mobile computing device 100 estimates the current location and provides the current location to the cloud-based server system 250. For example, in one embodiment, beacon ranging logic 120 generates an estimate of the current location of the mobile computing device 100 based at least in part on the estimated distances.

In one embodiment, the estimated current location of the mobile computing device 100, based on the beacon information, is used by the cloud-based server system 250 to extract location list information from a database of the cloud-based server system 250. The location list information corresponds to floor map information within the database. The floor map information is accessed and transmitted from the cloud-based server system 250 to the mobile computing device 100 via the communication network 240.

For example, in accordance with one embodiment, the floor map information corresponds to an area within a defined radial distance (e.g., 25 meters) from the estimated current location of the mobile computing device 100. In one embodiment, the defined radial distance can be set by the user of the mobile computing device 100. The mobile computing device 100 is configured to determine and render a display map from the floor map information and display the display map on a display screen of the mobile computing device 100. In this manner, the user can view the display map and mentally correlate features of the display map to his immediate surroundings.

In one embodiment, asset list information is extracted from the database based on the location list information. The location list information corresponds to the asset list information which is associated with physical assets that are near the estimated current location of the mobile computing device 100 within the enterprise. The asset list information is used to access asset information from an asset repository portion of the database, in accordance with one embodiment. The asset information is transmitted from the cloud-based server system 250 to the mobile computing device 100 via the communication network 240. Again, in accordance with one embodiment, a defined radial distance can be set by the user such that only asset information associated with assets that are within the defined radial distance of the user will be provided to the mobile computing device 100.

In accordance with one embodiment, the asset information includes asset type, asset location, and asset status. Based on the asset information, the mobile computing device 100 is configured to render asset icons corresponding to the physical assets associated with the asset information, and display the asset icons in an overlaid manner on the display map on the display screen of the mobile computing device 100. The asset icons may be visually encoded to provide, for example, status information associated with the assets (e.g., information indicating which assets need maintenance, or which assets have expired warranties). Visual encoding may involve, for example, color coding or marking with symbols. Other types of visual encoding are possible as well, in accordance with other embodiments.

In accordance with one embodiment, the user may select an asset icon on the display screen of the mobile computing device 100 to bring up (display) a menu of different types of asset data. The user may make a selection from the menu and view the asset data associated with the menu selection. In accordance with one embodiment, the different types of asset data include asset maintenance history, warranty info, machine drawings, and repair instructions. Other types of asset data are possible as well, in accordance with other embodiments.

The information displayed to the user on the mobile computing device 100 provides situation awareness to the user. That is, the user may view the display screen of the mobile computing device 100 to view a floor map corresponding to the estimated current location of the user, and to view the locations of assets, with respect to the floor map, that are proximate to the user. In this manner, the user's awareness of the situation (e.g., user location with respect to assets, and which assets need maintenance) are enhanced.

In accordance with one embodiment, as the user moves about the environment (e.g., the enterprise), the estimated current location of the mobile computing device 100 is dynamically updated. The mobile computing device 100 may go out of reception range of some beacon devices and come into reception range of other beacon devices as the user moves about. Accordingly, based on such movement of the user within the environment, the display map and the asset icons (and associated asset information) are dynamically updated in real time on the mobile computing device 100. In this manner, the situation awareness of the user is automatically and dynamically maintained as the situation changes due to movement of the user throughout the environment.

In accordance with one embodiment, the mobile computing device 100 stores user profile information that corresponds to the user. In fact, a mobile computing device 100 may store user profile information for multiple users. When a user logs in to, for example, a situation awareness application of the mobile computing device, the corresponding user profile information may be accessed from memory.

The user profile information may include, for example, a work role or trade of the user. For example, a user may be a maintenance worker who is an electrician, a mechanic, or a plumber. A user may instead be a supervisor, an auditor, or an inspector. In one embodiment, the user profile information is transmitted from the mobile computing device 100 to the cloud-based server system 250 via the communication network 240, for example, along with the beacon information (e.g., identification data and distance data).

The user profile information may be used by the cloud-based server system 250 to tailor or customize the floor map information and/or the asset information to the user, in accordance with one embodiment. For example, the cloud-based server system 250 may store global map data and global asset data. The user profile information may be used to filter or select local map data from the global map data, and local asset data from the global asset data, thus tailoring or customizing the floor map information and the asset information to the user.

Similarly, the user profile information may be used by the mobile computing device 100 to tailor or customize the floor map information and/or the asset information to the user, in accordance with one embodiment. For example, the mobile computing device 100 may store global map data and global asset data in memory. The user profile information may be used to filter or select local map data from the global map data, and local asset data from the global asset data, thus tailoring or customizing the floor map information and the asset information to the user. In accordance with one embodiment, global map and asset data may be downloaded to the mobile computing device 100 as part of installing a situation awareness application on the mobile computing device. In accordance with another embodiment, global map and asset data may be cached to memory on the mobile computing device over time as the mobile computing device is used by one or more users.

As one example, if the user is an electrician, the local floor map information and the local asset information may be limited to electrical information to aid in electrical maintenance of assets. If the user is a supervisor, the local floor map information and the local asset information may be limited to information that a supervisor would want to know (e.g., assets that were serviced today or this week, time it took to complete a task vs. the average time, if a warranty of an asset is about to expire, if an asset is expected to fail as predicted by mean-time-between-failure data). Such customizing limits the amount of data that has to be accessed by the mobile computing device, and limits the amount of information the user has to sort through on the mobile computing device.

In this manner, information accessed by a mobile computing device of a user can be tailored or customized to the location of the user within the environment and to a profile of the user. The information accessed by the mobile computing device is dynamically updated as the user moves about the environment with the mobile computing device. Information of interest is provided to the user. The user does not have to search for information of interest among other information. As a result, a user can freely move about an environment, making informed decisions about which assets to service, audit, or inspect.

Figure 2:
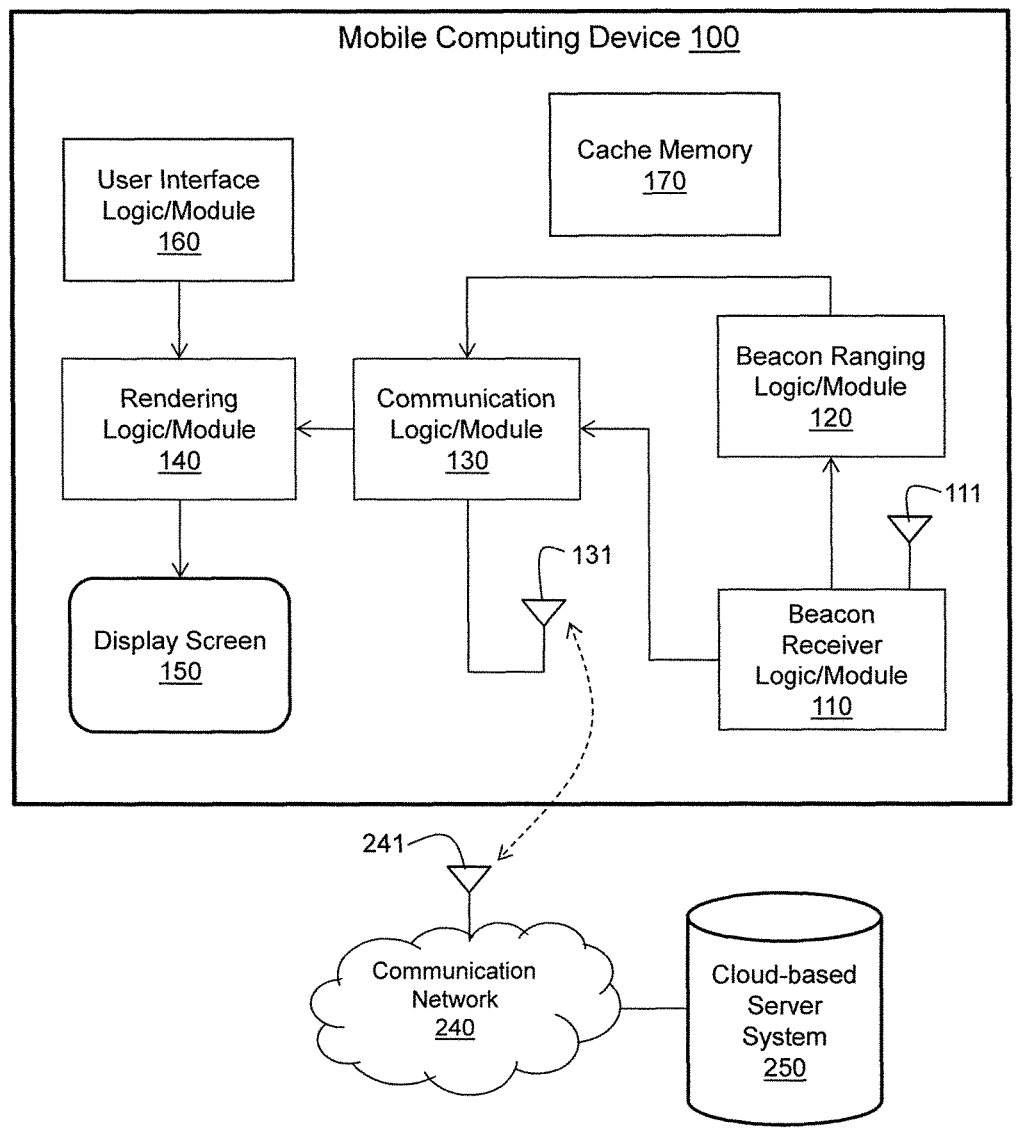
FIG. 2 illustrates one embodiment of a mobile computing device configured to provide situation awareness with respect to a user's surroundings within an environment.

FIG. 2 illustrates one embodiment of a mobile computing device 100 configured to provide situation awareness with respect to a user's surroundings (e.g., a user's immediate surroundings) within an environment. The mobile computing device 100 may be a wireless "smart" phone, in accordance with one embodiment. The mobile computing device 100 may be a wireless tablet computer, in accordance with another embodiment. Other embodiments of the mobile computing device 100 are possible as well. In general, a user (e.g., a worker of an enterprise) may carry the mobile computing device 100 throughout an environment. The environment may be a factory, a power plant, or a campus, for example. Other types of environments are possible as well.

With reference to FIG. 2, the mobile computing device 100 includes beacon receiver logic (module) 110, beacon ranging logic (module) 120, communication logic (module) 130, rendering logic (module) 140, display screen 150, user interface logic (module) 160, and cache memory 170. Together, the logics of FIG. 2 constitute situation awareness logic. The mobile computing device 100 may be configured to operably interface (e.g., wirelessly) to a cloud-based server system 250, in accordance with one embodiment.

Other embodiments may provide different logics or combinations of logics that provide the same or similar functionality as the mobile computing device 100 of FIG. 2. For example, in one embodiment, at least portions of the logics of FIG. 2 are part of an executable application (a situation awareness application) including algorithms and/or program modules configured to perform the functions of the logics. The application is stored in a non-transitory computer storage medium. That is, in one embodiment, at least some portions of the logics are implemented as modules of computer-executable instructions stored on a computer-readable medium. The instructions are executable by a processor of the mobile computing device to perform the functions described herein.

In accordance with one embodiment, a user may log-in to the situation awareness application such that the situation awareness application "knows" the identification of the user along with, for example, a role or trade of the user. In this manner, user profile data can be entered (or accessed if already stored on the mobile computing device 100) based on log-in information. The user profile data can be used to limit or filter the information accessed by the mobile computing device 100 (e.g., accessed from the cache memory 170 or from the cloud-based server system 250).

In one embodiment, beacon receiver logic 110 is configured to wirelessly receive beacon data (e.g., beacon identification data), via an antenna 111, as beacon signals from beacon devices positioned within the environment of an enterprise. The beacon devices transmit the beacon signals and, when the mobile computing device 100 is within reception range, the beacon receiver logic 110 receives the beacon signals. As discussed previously herein, in one embodiment, the beacon identification data includes a beacon major identifier and a beacon minor identifier for each beacon device. In one embodiment, beacon receiver logic 110 is compatible with a short-range, low-energy communication protocol such as, for example, a Bluetooth Low Energy (BTLE) protocol.

In one embodiment, beacon ranging logic 120 is configured to generate distance data based at least in part on signal strength of the beacon signals received by beacon receiver logic 110. The distance data is an estimate of distance between the mobile computing device 100 and each beacon device. As the distance between the mobile computing device 100 and a beacon device increases, the signal strength of the beacon signals received by the mobile computing device 100 decreases. In accordance with one embodiment, beacon ranging logic 120 is configured using a beacon software development kit (SDK).

In accordance with one embodiment, the situation awareness application on the mobile computing device 100 is configured to "call" (i.e., establish a communication link with) the cloud-based server system 250 using communication logic 130. Subsequently, in one embodiment, communication logic 130 is configured to wirelessly transmit the beacon data (e.g., the beacon identification data and the distance data) and the user profile data to the enterprise management system 250 via antenna 131. The beacon identification data is provided to communication logic 130 by beacon receiver logic 110. The distance data is provided to communication logic 130 by beacon ranging logic 120. The user profile data corresponds to a user of the mobile computing device, as discussed previously herein, and is stored in a memory of the mobile computing device 100. For example, the user profile data may indicate a role or trade of the user (e.g., a plumber, an electrician, a mechanic, a supervisor, an auditor, or an inspector).

In one embodiment, communication logic 130 is also configured to wirelessly receive map data and asset data from the cloud-based server system 250 via the antenna 131. For example, local map and asset data may be received. The local map data and the local asset data may correspond to a current location of the mobile computing device and to the user based on the user profile data and the beacon data (e.g., the beacon identification data and the distance data).

Global map and asset data is made up of local map and asset data. Global map and asset data may be received during installation of the situation awareness application and stored in a memory of the mobile computing device 100. Portions of the global map and asset data may subsequently be accessed by the mobile computing device 100 from the memory as local map and asset data based on beacon data and/or user profile data. Alternatively, global map and asset data may be received over time, as increments of local map and asset data that are built up and stored in the cache memory 170, as the situation awareness application on the mobile computing device is used by multiple users over time, for example. Subsequently, portions of the cached global map and asset data may be accessed as local map and access data may by the mobile computing device 100 from the cache memory 170 based on beacon data and/or user profile data.

Again, communication between communication logic 130 and the cloud-based server system 250 is accomplished through the communication network 240 having antenna 241. Communication logic 130 and the communication network 240 may be compatible with, for example, a WiFi communication protocol or a long term evolution (LTE) communication protocol, in accordance with certain embodiments. Compatibility with other communication protocols is possible as well, in accordance with other embodiments.

In one embodiment, rendering logic 140 is configured to determine and render a display map based on the local map data, and render asset icons based on the local asset data. The display map corresponds to a floor plan of a region or area around an estimated current location of the user. The asset icons represent physical assets that are located within the region or area around the estimated current location of the user. The current location of the user (i.e., with the mobile computing device) may be determined based on the beacon data. The rendering logic is also configured to visually encode the asset icons to provide a visual indication of the status of the corresponding physical assets within the environment.

The display map may include various elements representing a floor plan including, for example, representations of walls, doorways, hallways, and offices. The asset data may include various types of information for each asset within the floor plan. Such asset information may include, for example, asset type, asset location, asset drawings, asset warranty information, asset safety information, and asset repair instructions. Other types of floor plan elements and asset data are possible as well, in accordance with other embodiments.

In one embodiment, the mobile computing device 100 includes a display screen 150. The display screen 150 is configured to display the asset icons as overlaid onto the display map to facilitate user situation awareness within the environment. The display screen 150 may be based on, for example, light emitting diode (LED) technology or liquid crystal display (LCD) technology. Other types of display technologies are possible as well, in accordance with other embodiments. In accordance with one embodiment, beacon receiver logic 110, beacon ranging logic 120, communication logic 130, rendering logic 140, and the display screen 150 are configured to cooperatively operate to automatically and dynamically update and display the display map and the asset icons as the user moves about the environment with the mobile computing device 100.

In one embodiment, user interface logic 160 is configured to generate a graphical user interface (GUI) to facilitate user interaction with the mobile computing device 100. For example, user interface logic 160 includes program code that generates and causes the graphical user interface to be displayed based on an implemented graphical design of the interface. In response to user actions and selections via the GUI, associated aspects of providing situation awareness to the user are engaged. For example, a user may employ the GUI to select (e.g., "click on") asset icons displayed on the display screen 150 to call up and display certain types of asset information. In other embodiments, user interface logic 160 may also support user interaction with other user interfaces such as a keypad of the mobile computing device 100. Furthermore, in one embodiment, user interface logic 160 may be configured to facilitate the outputting and displaying of information (e.g., floor maps, asset icons), via the graphical user interface, on the display screen 150.

In accordance with one embodiment, the display screen 150 of the mobile computing device is implemented to display views of and facilitate user interaction with a graphical user interface (GUI) generated by user interface logic 160 (e.g., for viewing floor maps and asset icons). The graphical user interface may be associated with a situation awareness application, and user interface logic 160 may be configured to generate the graphical user interface.

Figure 3:
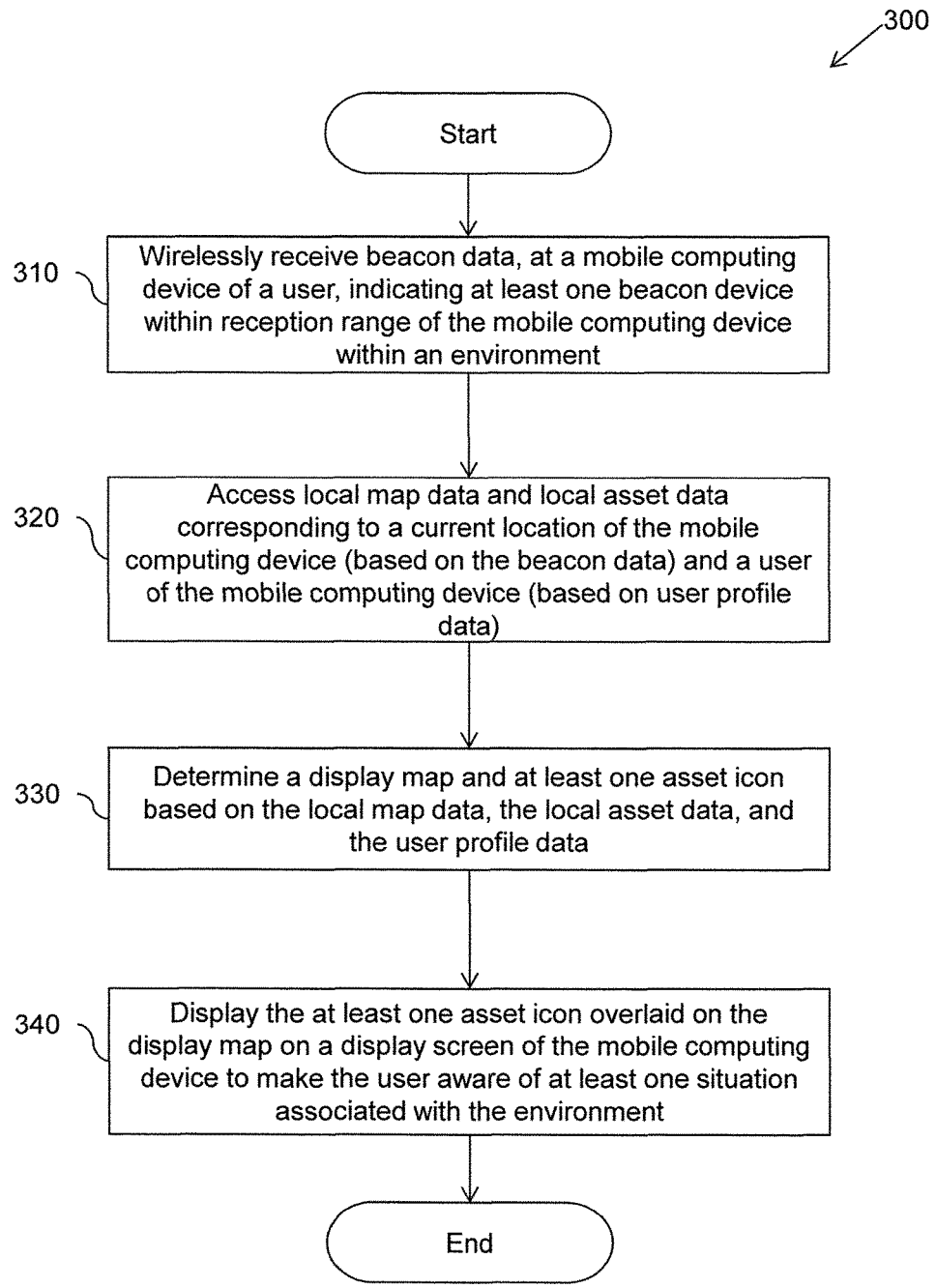
FIG. 3 illustrates one embodiment of a method, which can be performed by the mobile computing device of FIG. 2, to provide situation awareness to the user with respect to the user's immediate surroundings within an environment.

FIG. 3 illustrates one embodiment of a method 300, which can be performed by the mobile computing device 100 of FIG. 2, to provide situation awareness to the user with respect to the user's immediate surroundings within an environment. Method 300 describes the functions of the logics of FIG. 2 implemented to be performed by the mobile computing device 100 of FIG. 2, or by another computing device configured with algorithms of the method 300. For example, in one embodiment, method 300 is implemented by a computing device configured to execute a computer application by using at least a processor. The computer application is configured to process data in electronic form and includes stored executable instructions that perform the functions of at least method 300 and/or its equivalents.

Method 300 will be described from the perspective that method 300 is performed by the mobile computing device 100 of FIG. 2 as a user of the mobile computing device 100 freely moves within an environment. In some embodiments, implementation of method 300 may involve at least one processor (e.g., see FIG. 7) of the mobile computing device 100 that performs at least some of the described actions. As described herein, method 300 provides situation awareness to the user of the mobile computing device 100. In one embodiment, situation awareness may provide, for example, awareness of the user's location with respect to nearby assets, awareness of nearby assets that are to be serviced, and awareness of nearby assets that have been serviced. Other types of situation awareness may be provided as well, in accordance with various other embodiments.

Upon initiating method 300, at block 310, beacon data is wirelessly received as beacon signals by the mobile computing device 100 of a user from at least one beacon device. The beacon device is within reception range of the mobile computing device within an environment. In one embodiment, the beacon data includes beacon identification data (e.g., a beacon major ID and a beacon minor ID) that identifies the beacon. Reception of the beacon signals is performed by beacon receiver logic 110 of the mobile computing device 100, in accordance with one embodiment. The beacon signals are compatible with a short-range, low energy communication protocol (e.g., a BTLE protocol), in one embodiment.

At block 320, the mobile computing device 100 accesses local map data and local asset data. The local map data and the local asset data correspond to a current location of the mobile computing device and/or a user of the mobile computing device. The current location of the mobile computing device is based on the beacon data, and user profile data defines a user of the mobile computing device. The user profile data corresponds to the user of the mobile computing device 100 and may be pre-stored in a memory (e.g., see FIG. 7) of the mobile computing device 100. In one embodiment, the user profile data includes information with respect to a role, a trade, or a position of employment of the user.

Distance data (an estimate of distances between the mobile computing device and the beacon devices) may be estimated based on signal strength of the beacon signals. The current location of the mobile computing device may be derived from the beacon data, including the distance data. The stronger the signal strength, the closer the mobile computing device 100 is to the corresponding beacon device.

In one embodiment, the distance data is generated by beacon ranging logic 120 of the mobile computing device 100. The current location may be generated by the mobile computing device 100 based at least in part on the distance data, in accordance with one embodiment. Alternatively, the current location may be generated by the cloud-based server system 250 after receiving the beacon data (including the distance data) from the mobile computing device 100, in accordance with another embodiment.

In one embodiment, the local map data and the local asset data are accessed from a cloud-based server system. The cloud-based server system is configured to wirelessly serve the mobile computing device 100, based at least in part on the beacon data and the user profile data. Communication between the mobile computing device 100 and the cloud-based server system 250 may be via a communication network 240, in accordance with one embodiment. The local asset data may include, for example, video data, text data, and schematic drawing data associated with nearby physical assets within the environment. The local map data may correspond to a floor plan of the environment within a defined area around the mobile computing device 100.

For example, in one embodiment, the cloud-based server system 250 generates an estimate of the current location of the mobile computing device 100 based on the beacon identification data and the distance data. Also, in accordance with one embodiment, the cloud-based server system 250 effectively filters or limits the global map data and the global asset data based on the beacon identification data, the distance data, and the user profile data. In this manner, the information that is provided to the user via the mobile computing device 100 is that information in which the user is likely interested (i.e., local map and asset data). In one embodiment, reception of the local map data and the local asset data is performed by communication logic 130 of the mobile computing device 100.

The cloud-based server system 250 may be a part of the environment in which the user is currently located, or may be remotely located from the environment. In one embodiment, transmission of the beacon identification data, the distance data, and the user profile data to the cloud-based server system 250 is performed by the communication logic 130 of the mobile computing device 100.

In another embodiment, the local map data and the local asset data are accessed from cache memory 170 of the mobile computing device 100 based at least in part on the beacon data and the user profile data. The local map data and the local asset data may be a subset of global map data and global asset data for the entire environment, for example. The global map data and the global asset data may be stored in the cache memory 170 of the mobile computing device, for example.

In one embodiment, global map and global asset data may originally be stored in a database of the cloud-based server system 250. Subsequently, the global map and the global asset data may be received by the mobile computing device 100 from the cloud-based server system 250 and stored in a memory of the mobile computing device 100. Portions of the global map and the global asset data may subsequently be accessed by the mobile computing device 100 from the memory as local map and local asset data based on beacon data and/or user profile data.

Alternatively, in another embodiment, global map and asset data may be received over time. For example, increments of local map and asset data may be built up and stored in the cache memory 170, as the situation awareness application on the mobile computing device is used by multiple users over time. Subsequently, portions of the cached global map and asset data may be accessed as local map and access data by the mobile computing device 100 from the cache memory 170 based on beacon data and/or user profile data.

At block 330, the mobile computing device 100 determines and renders a display map and asset icons based on the local map data, the local asset data, and the user profile data. The determining and rendering is accomplished by rendering logic 140 of the mobile computing device 100, in accordance with one embodiment. As part of determining and rendering the asset icons, the asset icons may be visually encoded or highlighted. Such visual encoding or highlighting can provide a visual indication of, for example, a status of the physical assets, in the environment, that are associated with the asset icons. A status of a physical asset may include, for example, a maintenance status, a safety status (e.g., asset has had repeated safety violations), a warranty status, or a failure status.

At block 340, the display map is displayed on a display screen 150 of the mobile computing device 100 along with the asset icons as overlaid onto the display map in proper location with respect to the display map. The display map and the asset icons displayed on the display screen 150 provide situation awareness to the user of the mobile computing device 100 within the environment. For example, the display map and the asset icons displayed on the display screen 150 make the user aware of the conditions of physical assets corresponding to the asset icons.

As the user moves about within the environment, the mobile computing device 100 may move within range of new beacon devices and move out of range of other beacon devices. The mobile computing device 100 can continue to receive beacon identification data, generate distance data, and access updated local map and asset data (either from memory of the mobile computing device 100 or from the cloud-based server system 250 as previously described herein). As a result, updated map data and asset data is processed by the mobile computing device 100. Updated display maps and asset icons can be automatically displayed by the mobile computing device 100, based on the updated map data, the updated asset data, and the user profile data, thereby keeping the user updated with respect to the current situation based on the user's updated location within the environment. In a situation where the user is not near any assets, assets icons may not be determined, rendered, and displayed. Instead, just a display map of the floor plan may be determined, rendered, and displayed.

In one embodiment, the environment may include multiple buildings, and a user may move from one building to another (e.g., from a first building to a second building). Map data and asset data are associated with the buildings. After the user moves, for example, from the first building to the second building, map data and asset data that are associated with the second building are updated on the mobile computing device of the user based on updated beacon data and the user profile data.

In accordance with one embodiment, the user can select an asset icon, via the graphical user interface, displayed on the display screen 150 of the mobile computing device 100 which results in the mobile computing device 100 displaying a portion of the asset data. For example, asset data associated with an asset icon that may be displayed may include drawings, schematics, warranty information, historical servicing information, maintenance timing data, failure timing data, hazard information, and safety information. Other types of asset data may be available for display as well, in accordance with other embodiments.

In this manner, as a user moves within an environment, the user is dynamically provided with information that he is truly interested in via a mobile computing device. The information provided is associated with a current position of the user and to a profile of the user. The information may be stored in and managed by a cloud-based server system which can be accessed by the mobile computing device. Furthermore, the information may be downloaded to and stored in memory of the mobile computing device itself.

Even in embodiments where a cloud-based server system is primarily relied upon to access local map and asset data, there may be parts of the environment where the mobile computing device 100 is not able to wirelessly communicate with the cloud-based server system 250 (i.e., a "dead zone"). In accordance with one embodiment, as a user approaches such a "dead zone", the cloud-based server system 250 prompts the user to preload map data and asset data prior to entering the zone. Beacon signals and functionality still work in this area, however. Display maps and asset icons can still be determined, rendered, and displayed, based on the user's location within the "dead zone", using the pre-loaded information. When the user leaves the "dead zone" and returns to an area having network connectivity, updated information may be synchronized back to the cloud-based server system.

Figure 4:
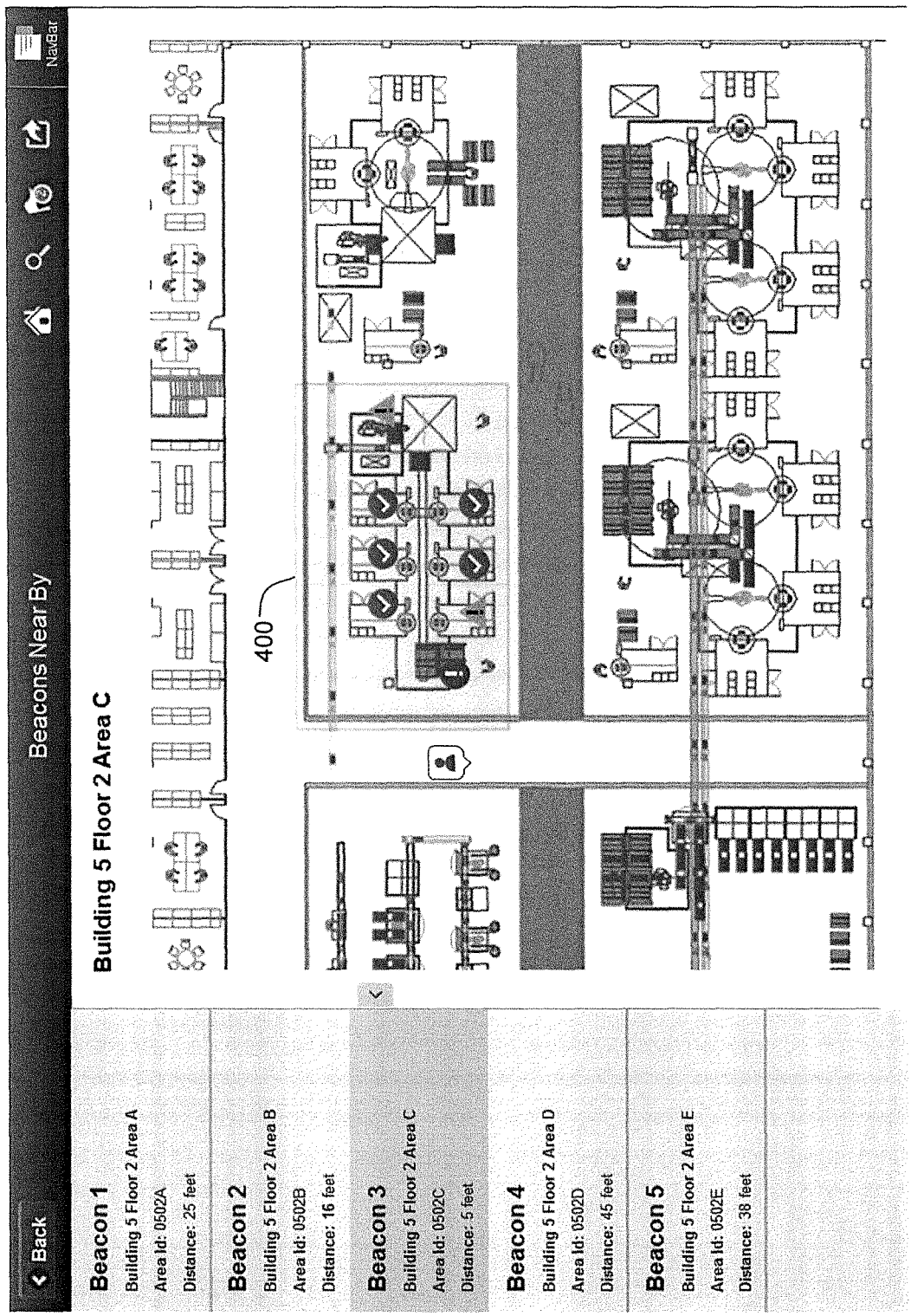
FIG. 4 illustrates one embodiment of a display map of a floor plan showing a portion of an environment, as displayed by the mobile computing device of FIG. 2 using the method of FIG. 3.

FIG. 4 illustrates one embodiment of a display map 400 of a floor plan (shaded region) showing a portion of an environment of an enterprise, as displayed by the mobile computing device 100 of FIG. 2 using method 300 of FIG. 3. Icons associated with assets that have been serviced, or that are to be serviced, are overlaid on the display map 400 (e.g., as circles or triangles) on the display map 400. For example, circle icons may represent desktop computer machines and triangle icons may represent copy machines.

With respect to display map 400, the assets that have been serviced are visually encoded with a check mark "✓". The assets that are still to be serviced are visually encoded with an exclamation point "!". By viewing the display map 400 with the visually encoded assets, the user can quickly assess the situation with respect to which assets have been serviced and which assets still need to be serviced.

Figure 5:
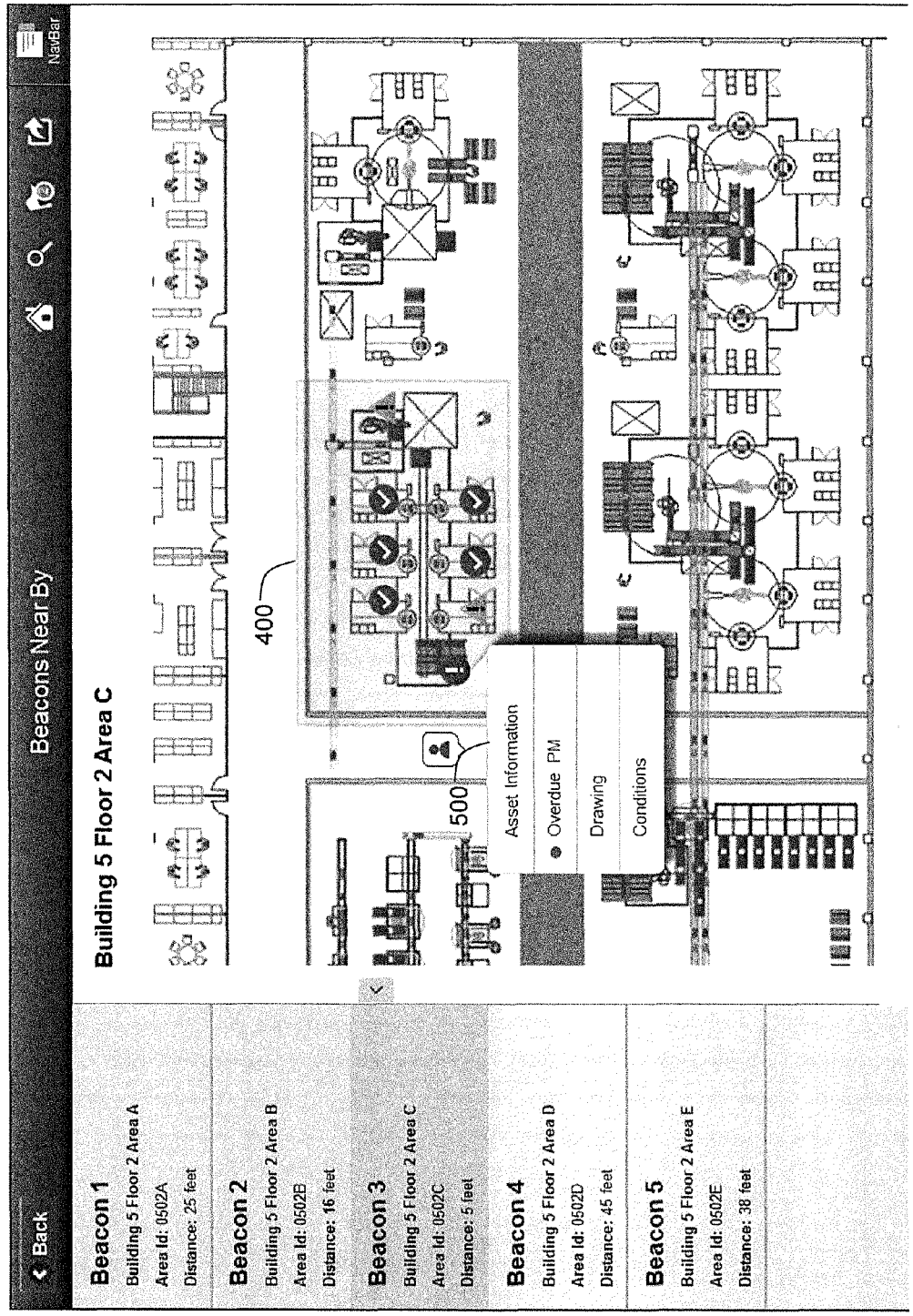
FIG. 5 illustrates one embodiment of the display map of FIG. 4 showing a menu.

FIG. 5 illustrates one embodiment of the display map 400 of FIG. 4 showing a menu 500. The menu 500 has popped up after a circular icon associated with a desktop computer to be serviced, as indicated by a "!", has been selected on a display screen 150 of the mobile computing device 100 by the user via a graphical user interface. The menu 500 includes the menu options of "asset information", "overdue preventative maintenance (PM)", "drawing", and "conditions".

Figure 6:
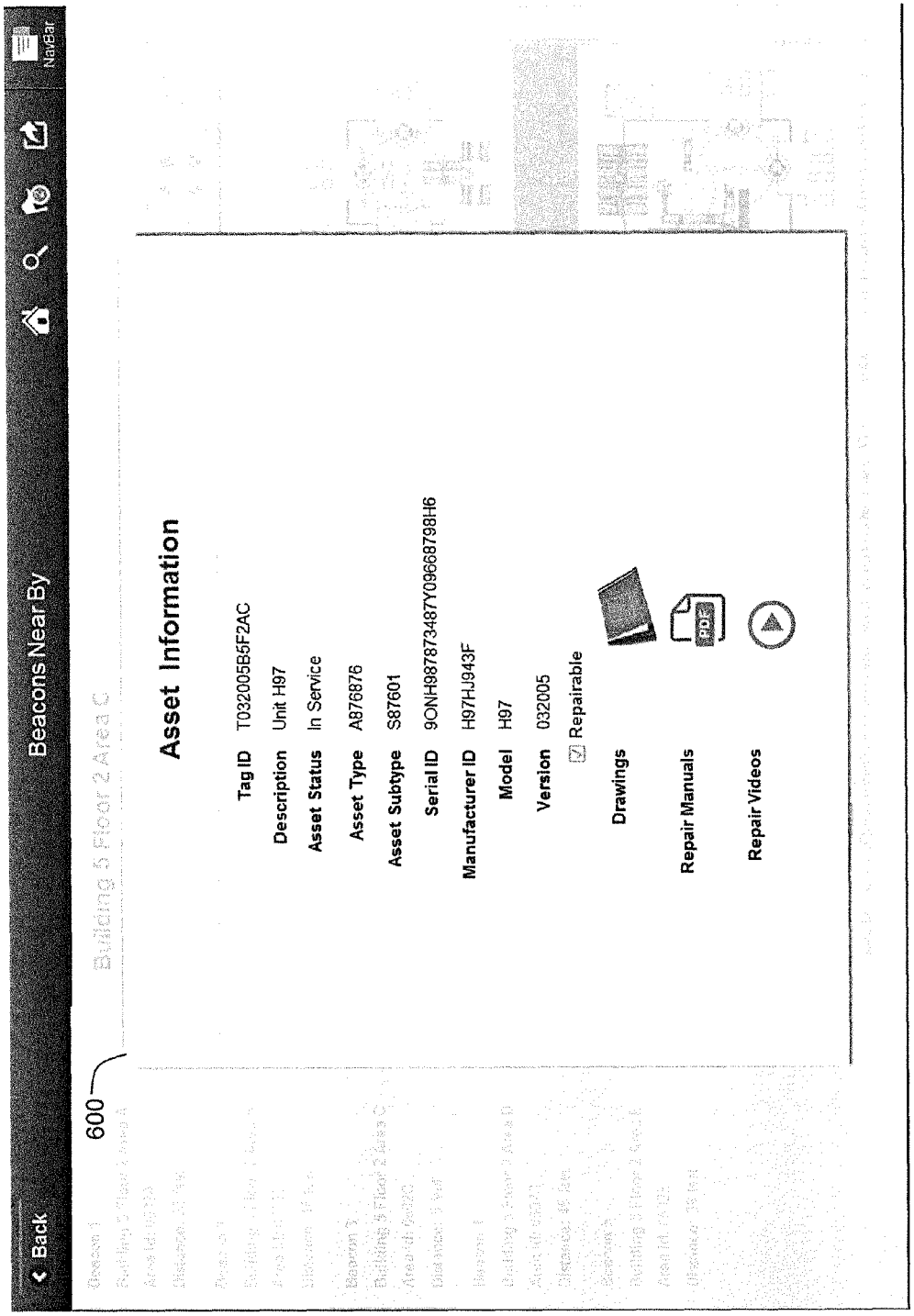
FIG. 6 illustrates one embodiment of the display map of FIG. 4 showing asset information after the user has made a menu selection from the menu of FIG. 5.

FIG. 6 illustrates one embodiment of a window 600 of asset information, overlaid on the display map 400 of FIG. 4, showing asset information after the user has made the "asset information" menu selection from the menu 500 of FIG. 5. The user may view the asset information in the window 600 to verify various aspects of the asset. Furthermore, the user may select drawings, repair manuals, or repair videos as desired from associated graphical user interface icons displayed in the window 600.

In one embodiment, the drawings may be stored as images with transparent backgrounds. As a result, one drawing may be overlaid onto another drawing, forming layers. The drawings may be of different types. For example, some drawings may be electrical drawings and other drawings may be plumbing drawings. Based on a role (or roles) of a user as defined in a user profile, the system "knows" what type of drawings to provide to the mobile computing device. For example, if a user has multiple skills or roles (e.g., electrical and plumbing), the user can view both types of drawings superimposed on top of the basic building drawings on the mobile computing device 100. Furthermore, in accordance with one embodiment, the user can turn on/off any of the layers displayed. Another user, having a different role (e.g., HVAC) as defined in his user profile, can receive and view drawings of a different type (e.g., HVAC drawings).

In accordance with one embodiment, once a user services an asset, the user can enter service information into the mobile computing device 100 (e.g., via the graphical user interface provided by user interface logic 160). The service information may indicate that the asset has been successfully serviced, a time and date of servicing, and other information related to the servicing of the asset. The service information may be transmitted to the cloud-based server system 250 by communication logic 130 of the mobile computing device 100. As a result, the cloud-based server system 250 can proceed to update asset information associated with the serviced asset in the database.

In this manner, a user of the mobile computing device 100 can easily become aware of the status of assets immediately around him. The user can also easily select an asset and view various types of information associated with the selected asset. As a result, the user has the information he needs to service the asset. The user does not have to search an enterprise management system to obtain information of interest. By walking around the environment, having beacon devices, the information that is of interest to the user is automatically and dynamically displayed on his mobile computing device.

Systems, methods, and other embodiments have been described that are configured to provide situation awareness to a user of a mobile computing device. In one embodiment, beacon receiver logic is configured to wirelessly receive beacon data, as beacon signals, indicating at least one beacon device that is within reception range of the mobile computing device within an environment. Rendering logic is configured to determine a display map and asset icons based on local map data, local asset data, and user profile data. The local map data and the local asset data correspond to a current location of the mobile computing device based on the beacon data, and a user of the mobile computing device based on user profile data. A display screen of the mobile computing device is configured to display the asset icons overlaid on the display map to make the user aware of a situation associated with the environment.

Computing Device Embodiment

Figure 7:
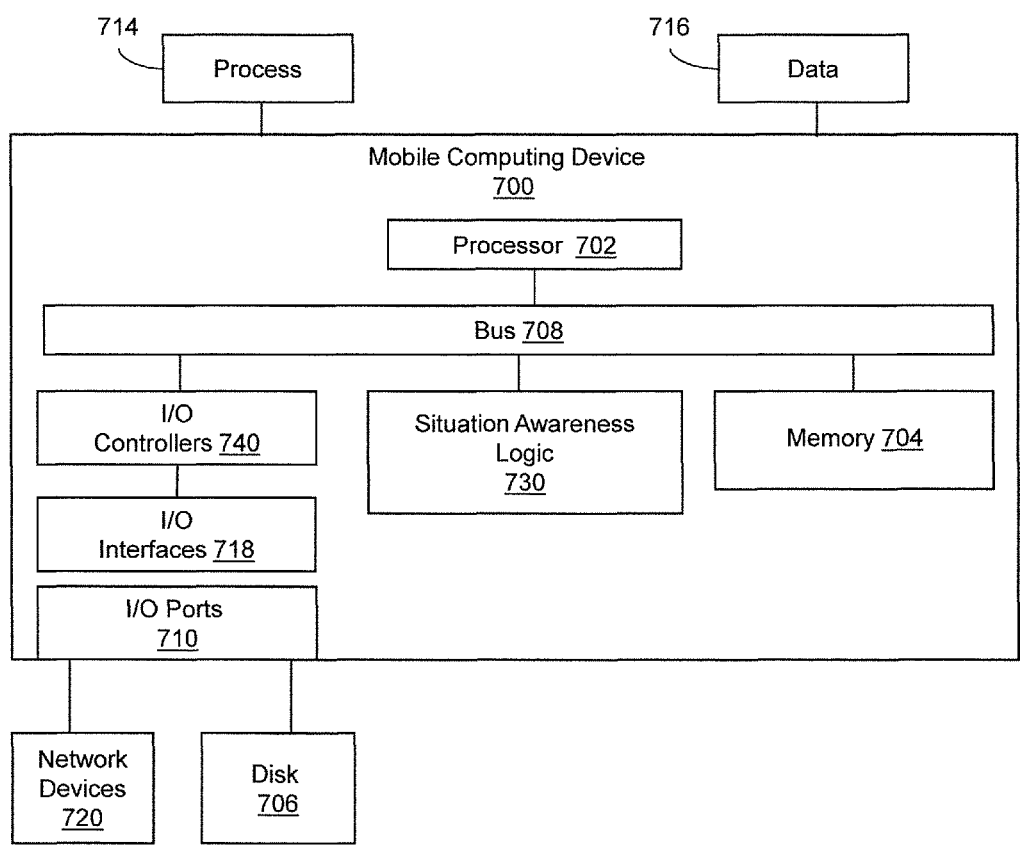
FIG. 7 illustrates one embodiment of a mobile computing device upon which the functions described herein, to provide situation awareness to a user, may be implemented.

FIG. 7 illustrates an example of a computing device that is configured and/or programmed with one or more of the example systems and methods described herein, and/or equivalents. FIG. 7 illustrates one embodiment of a computing device upon which the functions described herein, to provide situation awareness to a user, may be implemented. The example computing device may be a mobile computing device 700 that includes a processor 702, a memory 704, and input/output ports 710 operably connected by a bus 708.

In one example embodiment, the mobile computing device 700 may include situation awareness logic 730 (corresponding to at least portions of the logics of FIG. 2). Situation awareness logic 730 is configured with a programmed algorithm, as disclosed herein, to interact with beacon devices (and possibly a cloud-based server system) to determine and render display maps and asset icons based on map data and asset data. The map data and the asset data correspond to a current position of a user of the mobile computing device 700 and user profile data. In different examples, the logic 730 may be implemented in hardware, a non-transitory computer-readable medium with stored instructions, firmware, and/or combinations thereof. While the logic 730 is illustrated as a hardware component attached to the bus 708, it is to be appreciated that in other embodiments, the logic 730 could be implemented in the processor 702, a module stored in memory 704, or a module stored in disk 706.

In one embodiment, logic 730 or the mobile computing device 700 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the providing of situation awareness to a user. The means may also be implemented as stored computer executable instructions that are presented to mobile computing device 700 as data 716 that are temporarily stored in memory 704 and then executed by processor 702.

Logic 730 may also provide means (e.g., hardware, non-transitory computer-readable medium that stores executable instructions, firmware) for facilitating the providing of situation awareness to a user.

Generally describing an example configuration of the mobile computing device 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected (wired or wirelessly) to the mobile computing device 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the mobile computing device 700.

The mobile computing device 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The mobile computing device 700 can operate in a network environment and thus may be connected to the network devices 720 via the i/o interfaces 718, and/or the i/o ports 710. Through the network devices 720, the mobile computing device 700 may interact with a network. Through the network, the mobile computing device 700 may be logically connected to remote computers. Networks with which the mobile computing device 700 may interact include, but are not limited to, a LAN, a WAN, and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.

RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected" or configured to "operably interface", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A method implemented by a mobile computing device, the method comprising:
    wirelessly receiving beacon data indicating at least one beacon device within reception range of the mobile computing device within an environment;
    accessing local map data and local asset data, wherein the local map data and the local asset data correspond to:
        (i) a current location of the mobile computing device based on the beacon data, and
        (ii) a user of the mobile computing device based on user profile data, wherein the user profile data identifies a given user role;
    selecting a given set of asset icons from a plurality of asset icons, wherein the given set of asset icons is associated with the given user role, and another set of asset icons of the plurality of asset icons is associated with another user role;

determining a display map and at least one asset icon of the given set of asset icons based at least in part on the local map data, the local asset data, and the user profile data; and displaying the at least one asset icon overlaid on the display map on a display screen of the mobile computing device to make the user aware of at least one situation associated with the environment, wherein the other set of asset icons is hidden from view in the display map.

2. The method of claim 1, further comprising:

wirelessly receiving updated beacon data, as the user moves about the environment with the mobile computing device, indicating at least one other beacon device within reception range of the mobile computing device;

accessing updated map data and updated asset data, wherein the updated map data and the updated asset data correspond to:
  (i) an updated location of the mobile computing device based on the updated beacon data, and
  (ii) the user of the mobile computing device based on the user profile data;

determining an updated display map and at least one updated asset icon of the given set of asset icons based at least in part on the updated map data, the updated asset data, and the user profile data; and displaying the at least one updated asset icon overlaid on the updated display map on the display screen of the mobile computing device to make the user aware of at least one other situation associated with the environment.

3. The method of claim 1, wherein the local map data and the local asset data are accessed from a cloud-based server system, configured to wirelessly serve the mobile computing device, based at least in part on the beacon data and the user profile data.

4. The method of claim 1, wherein the local map data and the local asset data are accessed from cache memory of the mobile computing device based at least in part on the beacon data and the user profile data, and wherein the local map data and the local asset data are a subset of global map data and global asset data stored in the cache memory.

5. The method of claim 1, further comprising installing global map data and global asset data onto the mobile computing device, wherein the local map data and the local asset data are part of the global map data and the global asset data, respectively.

6. The method of claim 1, wherein the local asset data includes at least one of video data, text data, and schematic drawings data corresponding to at least one physical asset within the environment.

7. The method of claim 1, wherein the local map data corresponds to a floor plan of the environment within a defined area around the current location of the mobile computing device.

8. The method of claim 1, further comprising generating distance data based at least in part on signal strength of beacon signals, wherein the beacon data is wirelessly received via the beacon signals from the at least one beacon device, and wherein the distance data is an estimate of a distance between the mobile computing device and the at least one beacon device.

9. The method of claim 1, further comprising visually encoding the at least one asset icon, as part of the determining of the at least one asset icon, to provide a visual indication of at least one status of at least one physical asset within the environment corresponding to the at least one asset icon.

10. The method of claim 9, wherein the at least one status includes one or more of:
  a maintenance status of the at least one physical asset;
  a safety status of the at least one physical asset;
  a warranty status of the at least one physical asset; and
  a failure status of the at least one physical asset.

11. The method of claim 1, further comprising displaying a portion of the local asset data on the display screen of the mobile computing device in response to the user selecting the at least one asset icon via a graphical user interface of the mobile computing device.

12. The method of claim 11, wherein the portion of the local asset data includes one or more of:
  maintenance history data of at least one physical asset corresponding to the at least one asset icon;
  safety history data of the at least one physical asset;
  warranty data associated with the at least one physical asset;
  maintenance timing data related to maintenance to be performed on the at least one physical asset; and
  failure timing data related to a next expected failure of the at least one physical asset.

13. A mobile computing device, comprising:

beacon receiver logic configured to wirelessly receive beacon data, as beacon signals, indicating at least one beacon device within reception range of the mobile computing device within an environment;

rendering logic configured to determine a display map based at least in part on local map data and local asset data, wherein the local map data and the local asset data correspond to:
  (i) a current location of the mobile computing device based on the beacon data, and
  (ii) a user of the mobile computing device based on the user profile data, wherein the user profile data identifies a given user role;
  wherein the rendering logic is configured to determine at least one asset icon from a given set of asset icons from a plurality of asset icons, wherein the given set of asset icons is associated with the given user role, and another set of asset icons of the plurality of asset icons is associated with another user role; and a display screen that displays the at least one asset icon overlaid on the display map to make the user aware of at least one situation associated with the environment, wherein the other set of asset icons is hidden from view in the display map.

14. The mobile computing device of claim 13, wherein the beacon receiver logic and the rendering logic are configured to facilitate updating of the display map and the at least one asset icon on the display screen as the user moves about the environment with the mobile computing device.

15. The mobile computing device of claim 13, wherein the rendering logic is further configured to visually encode the at least one asset icon to provide a visual indication of at least one status of a physical asset within the environment associated with the at least one asset icon.

16. The mobile computing device of claim 13, further comprising beacon ranging logic configured to generate distance data based at least in part on signal strength of the beacon signals, wherein the distance data is an estimate of a distance between the mobile computing device and the at least one beacon device.

17. The mobile computing device of claim 13, further comprising user interface logic configured to provide a graphical user interface to facilitate user selection of the at least one asset icon to activate displaying of a portion of the local asset data on the display screen.

18. The mobile computing device of claim 13, further comprising communication logic configured to:
wirelessly transmit at least the beacon data and the user profile data to a cloud-based server system; and
wirelessly receive at least the local map data and the local asset data from the cloud-based server system based at least in part on the beacon data and the user profile data.

19. A non-transitory computer-readable medium storing computer-executable instructions that, when executed by a mobile computing device, cause the mobile computing device to perform functions, wherein the instructions comprise instructions for:
wirelessly accessing global map data and global asset data from a cloud-based computing system, wherein the global map data and the global asset data correspond to floor plans and physical assets within an environment;
storing the global map data and the global asset data in cache memory of the mobile computing device;
wirelessly receiving beacon data indicating at least one beacon device within reception range of the mobile computing device within the environment; and
accessing a portion of the global map data as local map data and a portion of the global asset data as local asset data from the cache memory based at least in part on the beacon data and user profile data of a user stored on the mobile computing device, wherein the user profile data identifies a given user role;
selecting a given set of asset icons from a plurality of asset icons, wherein the given set of asset icons is associated with the given user role, and another set of asset icons of the plurality of asset icons is associated with another user role;
determining a display map and at least one asset icon of the given set of asset icons based at least in part on the local map data, the local asset data, and the user profile data; and
displaying the at least one asset icon overlaid on the display map on a display screen of the mobile computing device, wherein the other set of asset icons is hidden from view in the display map.

20. The non-transitory computer-readable medium of claim 19, wherein the instructions further include instructions for:
visually encoding the at least one asset icon to provide a visual indication of at least one condition of at least one physical asset, associated with the at least one asset icon, within the environment.

21. The non-transitory computer-readable medium of claim 19, wherein the instructions further include instructions for:
wirelessly receiving updated beacon data, as the user moves about the environment with the mobile computing device, indicating at least one other beacon device within reception range of the mobile computing device;
accessing updated map data and updated asset data, wherein the updated map data and the updated asset data correspond to:
(i) an updated location of the mobile computing device based on the updated beacon data, and
(ii) the user stored on the mobile computing device based on the user profile data;
determining an updated display map and at least one updated asset icon of the given set of asset icons based at least in part on the updated map data, the updated asset data, and the user profile data; and
displaying the at least one updated asset icon overlaid on the updated display map on the display screen of the mobile computing device to make the user aware of at least one other situation associated with the environment.

22. The non-transitory computer-readable medium of claim 19, wherein the local map data and the local asset data are accessed from a cloud-based server system, configured to wirelessly serve the mobile computing device, based at least in part on the beacon data and the user profile data.

23. The non-transitory computer-readable medium of claim 19, wherein the local map data and the local asset data are accessed from cache memory of the mobile computing device based at least in part on the beacon data and the user profile data, and wherein the local map data and the local asset data are a subset of global map data and global asset data stored in the cache memory.

24. The non-transitory computer-readable medium of claim 19, wherein the local asset data includes at least one of video data, text data, and schematic drawings data corresponding to at least one physical asset within the environment.

25. The non-transitory computer-readable medium of claim 19, wherein the local map data corresponds to a floor plan of the environment within a defined area around the current location of the mobile computing device.

26. The non-transitory computer-readable medium of claim 19, wherein the instructions further include instructions for generating distance data based at least in part on signal strength of beacon signals, wherein the beacon data is wirelessly received via the beacon signals from the at least one beacon device, and wherein the distance data is an estimate of a distance between the mobile computing device and the at least one beacon device.

* * * * *

UNITED STATES PATENT AND TRADEMARK OFFICE
CERTIFICATE OF CORRECTION

PATENT NO. : 10,187,743 B2
APPLICATION NO. : 14/840221
DATED : January 22, 2019
INVENTOR(S) : Thomas et al.

Page 1 of 1

It is certified that error appears in the above-identified patent and that said Letters Patent is hereby corrected as shown below:

In the Specification

In Column 9, Line 6, delete "may by" and insert -- may be --, therefor.

Signed and Sealed this
Twenty-eighth Day of January, 2020

Andrei Iancu
*Director of the United States Patent and Trademark Office*